United States Patent Office 3,001,954
Patented Sept. 26, 1961

3,001,954
DIFFICULTLY INFLAMMABLE EXPANDABLE STYRENE POLYMER AND PROCESS FOR MAKING SAME
Karl Buchholz and Fritz Stastny, Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed Mar. 4, 1957, Ser. No. 643,553
Claims priority, application Germany Mar. 10, 1956
15 Claims. (Cl. 260—2.5)

This invention relates to difficultly inflammable styrene polymers and a process for the production of such styrene polymers.

It is already known to render styrene polymers difficultly inflammable by the addition of halogen-containing substances. When using chlorine-containing substances, about 20 to 30% of chlorine are necessary in the final product in order to achieve a sufficient flame-resistant effect. If bromine-containing substances are used instead of chlorine-containing substances, then it is sufficient for the end product to contain 2 to 4% of bromine in order that it should be rendered difficultly inflammable.

As a rule the bromine-containing compounds are incorporated with the sytrene polymers after the polymerization. The production of homogeneous mixtures of the styrene polymers and the bromine compounds frequently offers difficulties. Moreover an additional working operation is necessary for the mixing. If on the other hand attempts are made to add the bromine-containing compounds to the monomeric styrene and to carry out the polymerization of the styrene in the presence of these compounds, it is usually found that the bromine compounds influence the polymerization in an adverse fashion. Among such disadvantageous effects there may be mentioned especially chain-breaking reactions during the polymerization which are caused by the splitting off of hydrogen bromide or even bromine. For this reason it is not possible to prepare polymers with high molecular weights by this method under otherwise comparable conditions. For example if in the polymerization of styrene under conditions under which normally a molecular weight of about 200,000 is obtained, 3% of alpha.beta-dibromostyrene are added, a polystyrene is obtained having a molecular weight of at the most about 60,000. Polymers with such low molecular weights are, however, brittle and unsuitable for many fields of use. Polystyrenes with low molecular weights are also obtained by adding the tetrabromide of butanediol-1.4-divinyl ether to the monomeric styrene.

A further disadvantage of the flame-proofing of styrene polymers with bromine compounds is to be seen in the fact that many bromine compounds exhibit a pronounced softening action on the polymers. The softening point of these polymers is thereby reduced to such an extent that their technical employment is very strongly restricted. This is true for example of the addition of mono-, di- or tri-bromobenzenes.

The said disadvantages are obviated by the present invention, an object of which is to provide a new difficultly inflammable styrene polymers. A further object of the invention is to provide a process by means of which difficultly inflammable styrene polymers can be prepared in a simple way. A specific object of the invention is to provide difficultly inflammable expandable styrene polymers and a process for the production of such styrene polymers. Another object of the invention is to provide porous styrene polymers which are difficultly inflammable.

The said objects are achieved by adding to the styrene polymers a small amount of an ester of 2.3-dibromopropanol-1. It is preferred to add the said ester to the monomeric styrene and to polymerize this mixture by conventional methods. In this way neither the molecular weight nor the softening range of the styrene polymers is appreciable altered.

As examples of suitable esters of 2.3-dibromopropanol there may be mentioned the esters of this alcohol with phosphoric acid (m. wt. 214.1), cyanuric acid (m. wt. 129), carbonic acid (m. wt. 62), acetic acid (m. wt. 60), oxalic acid (m. wt. 126.07) and succinic acid (m. wt. 118.09). Thus, the useful acids for the purposes of this invention have molecular weights in the range of from 60 to about 215. Those esters are preferred which have a high bromine content, which are soluble in the monomeric styrene and which are compatible with the styrene polymer.

The amount of the said bromine-containing esters is preferably chosen so that in the final styrene polymer the bromine content lies between 0.2 and 6% with reference to the weight of the styrene polymer. According to this invention, styrene polymers are preferred having bromine contents between 1.5 and 5%.

The bromine-containing esters can be prepared by adding on bromine to the corresponding allyl esters or by esterification of the acids with 2.3-dibromopropanol-1 which in turn is obtained in the usual way by adding on bromine to allyl alcohol.

If it is desired to add the esters of 2.3-dibromopropanol to the ready-made styrene polymers, the conventional mixing apparatus used in the plastics industry can be utilized, such as calenders, kneaders and endless screws. The styrene polymer is preferably softened by heating before the mixing. The addition of the esters of 2.3-dibromopropanol to the monomeric styrene has the advantage that the difficultly inflammable polymerized styrene is directly obtained by the polymerization without an additional mechanical or thermal treatment. Moreover it is possible by working in this way to disperse the agent for achieving resistance to flame homogeneously in the styrene polymer without difficulty.

The polymerization is carried out in known manner. It is possible to polymerize in bulk or by the suspension, solution or emulsion methods. The suspension or bead polymerization method is preferred with polymerization temperatures of between 40° and 100° C. To initiate the polymerization it is preferable to use the known radical-forming polymerization initiators, for example peroxides, such as benzoyl peroxide, lauroyl peroxide, cyclohexanone peroxide, or azo compounds such as azoisobutyronitrile.

The term "styrene" in the sense of the present invention includes both unsubstituted styrene and also substituted styrenes. Suitable substituted styrenes are for example alpha - methylstyrene, ortho - methylstyrene, meta-methylstyrene, para-methylstyrene, ar-dimethylstyrenes, ar-ethylstyrenes and mixtures of such styrenes.

Other monomeric compounds, preferably other compounds which contain the group $CH_2=C<$, such as acrylonitrile, N-vinyl-carbazole, acrylic esters, methyl methacrylate and vinyl esters, may also be copolymerized with the styrene. The styrene polymers according to this invention should preferably contain at least 50% of styrene. The styrene polymers should preferably be thermoplastic so that linear polymers are of great importance. There may be used for this invention, however, branched or cross-linked styrene polymers, such as are obtained by polymerizing-in bifunctional monomers; slightly branched styrene polymers, which contain at the most about 1% of divinyl benzene or another divinyl compound and are still thermoplastic, are especially suitable.

According to a modification of the invention, which is of special interest, expandable difficultly-inflammable styrene polymers can be prepared. For this purpose a blowing agent is added to the mixtures of monomeric styrene and the ester of 2.3-dibromopropanol, the said blowing agent being capable of expanding the final styrene polymer when it is heated. Such blowing agents are for example readily volatile liquids, which preferably do not dissolve the styrene polymer, or also gases. As examples of such liquid blowing agents there may be mentioned aliphatic and cycloaliphatic hydrocarbons having boiling points or boiling limits between 20° and 60° C., such as petroleum ether, pentane, hexane, cyclopentane and cyclohexane. Other useful blowing agents are for example propane, butane, carbon dioxide, gaseous halogenated hydrocarbons, such as difluoro-dichloromethane. The foregoing hydrocarbons are nonsolvents for polystyrene. The mixtures containing blowing agents are expanded by heating them to a temperature above the softening point of the styrene polymer. There are thereby obtained difficultly inflammable porous styrene polymers with closed cells and of low specific gravity, which can be used in many fields of industry, for example as insulation material against heat, cold or sound.

The difficultly inflammable and expandable styrene polymers may also be prepared by subsequent treatment with an expanding agent of the difficultly inflammable styrene polymers, but the addition of the ester of 2.3-dibromopropanol and the expanding agent to the monomers is more preferable.

The expression "difficultly inflammable" used in this specification is intended to mean that the styrene polymer will burn only in an extraneous flame but will not burn without an extraneous flame and that a flame which is already present will become extinguished when the extraneous flame is removed.

The following examples will further illustrate this invention but the invention is not restricted to these examples. The parts specified in the examples are parts by weight.

*Example 1*

A mixture of 20,000 parts of water, 80 parts of barium sulfate (suspension stabilizer), 9,700 parts of styrene, 30 parts of benzoyl peroxide and 300 parts of tri-(2.3 - dibromopropanol-1)-phosphate [tri-(2.3-dibromopropanol-1)-ortho-phosphoric acid ester] is polymerized in an autoclave while stirring for 25 hours at 70° C. and 10 hours at 80° C. The polymer, which is obtained in the form of small balls with diameters of 0.002 to 1.5 millimetres, is filtered off, washed and dried at 70° C. It has a molecular weight of about 180,000.

Shaped articles prepared from this polymer by the injection molding method, which have practically the same properties as shaped articles from commercial polystyrene, which does not contain any bromine compound, burn only with difficulty when they are held in a flame. After removal from the extraneous flame, they become extinguished immediately.

By working up this polymer by injection molding, it is preferable, to avoid corrosion phenomena in the injection molding machine, to add substances which bind bromine and hydrogen bromide, such as phenoxypropene oxide, amines, zinc stearate, cadmium stearate, lead stearate or basic salts.

If, instead of the 2.3-dibromopropanol ester, there is added the same amount of alpha.beta-dibromostyrene, a polymer is obtained with a molecular weight of only about 60,000. The shaped articles prepared therefrom are so brittle that they break even when removed from the molds.

*Example 2*

20,000 parts of water, 30 parts of poly-N-vinyl-pyrrolidone (protective colloid), 1 part of sodium pyrophosphate, 4,800 parts of styrene, 4,800 parts of alpha-methyl-acrylic acid methyl ester, 400 parts of tri-(2.3-dibromopropanol-1)-isocyanurate and 30 parts of azo-di-isobutyronitrile are polymerized under the same conditions as in Example 1, worked up and dried.

The polymer has a molecular weight of about 200,000 and may be worked up well by injection molding to shaped articles which will not burn further without an extraneous flame and which have good mechanical test values.

*Example 3*

20,000 parts of water, 60 parts of a copolymer of 95% of N-vinylpyrrolidone and 5% of methyl acrylate (protective colloid), 2 parts of sodium pyrophosphate, 18,800 parts of styrene, 1,200 parts of tri-(2.3-dibromopropanol-1)-phosphate, 1,500 parts of petroleum ether (boiling point 25° to 35° C.) and 60 parts of benozyl peroxide are charged into a stirring pressure-tight vessel and, after forcing in 3 excess atmospheres of nitrogen, polymerized while stirring for 20 hours at 60° C. and then for 15 hours at 80° C.

The polymer, which after washing is dried at 30° C., consists of particles of about the size of rice grains and has a molecular weight of about 160,000.

By heating to 95° to 100° C., for example in boiling water, the resultant polymer expands to 30 to 40 times its original volume and can then be worked up, for example in perforated molds, to plates, blocks or shaped articles of any kind. The density of these foamed-up bodies amounts to 20 to 30 kilograms per cubic metre.

These finished articles are then stored at 40° to 50° C. until the blowing agent has evaporated. The foamed articles burn only badly and become extinguished when the extraneous flame is removed.

*Example 4*

10,000 parts of water, 30 parts of the same protective colloid as in Example 3, 1 part of sodium pyrophosphate, 7,640 parts of styrene, 1,910 parts of acrylonitrile, 450 parts of tri-(2.3-dibromopropanol-1)-phosphate, 35 parts of benzoyl peroxide and 750 parts of petroleum ether (boiling point 35° to 50° C.) are charged into a stirring pressure-tight vessel and, after forcing in 4 excess atmospheres of nitrogen, polymerized for 30 hours at 70° C. while stirring.

The polymer may be worked up as described in Example 3 to shaped foamed-up articles which are flame-resistant and are moreover stable to aliphatic hydrocarbons, as for example standard gasoline.

*Example 5*

A solution of 20 parts of polystyrene, 80 parts of styrene, 6 parts of petroleum ether (pentane fraction), 4 parts of tri-(2.3-dibromopropanol-1)-phosphate and 2 parts of lauroyl peroxide is charged into a tin. The tin is well closed and kept at 24° to 30° C. for 8 weeks. In this time the contents polymerize to a solid block. The polymer is ground and can then be worked up as described in Example 3 into flame-resistant porous articles with densities of up to 0.02 to 0.04.

*Example 6*

100 grams of expandable polystyrene particles which contain about 5% of pentane are stored for 15 minutes in water at 95° C. while mixing. 5 litres of porous individual particles are obtained which are sprayed with 100 grams of a 10% alcoholic solution of tri-(2.3-dibromopropanol-1)-phosphate while mixing well. The product is allowed to lie in the air for 30 minutes and then a perforated closable mold of 500 cubic centimetres' capacity is filled with the pre-expanded particles and the mold kept in water at 100° C. for 10 minutes. After cooling, a shaped article of the specific gravity 0.05 is obtained which will not burn in its own flame.

*Example 7*

50 parts of polyisobutylene and 65 parts of tri-(2.3-dibromopropanol-1)-phosphate are mixed into 950 parts of polystyrene on mixing rollers at 140° C. The mixture is comminuted in a cross-beater mill so that particles of about 1 to 3 millimetres' diameter are formed. These particles are kept in a stirring vessel in a mixture of 5,000 parts of water and 80 parts of petroleum ether of the boiling range 45° to 50° C. while stirring rapidly at 30° to 40° C. for 96 hours. The resultant particles of plastic containing petroleum ether are dried for a short time in the air and expanded and sintered in a perforated closable mold which is filled to the extent of about 10% with the expanded plastic, by heating with steam at 107° C. The whole is cooled and a foamed up article is obtained which will burn only in an extraneous flame and which has a specific gravity of 0.1.

*Example 8*

An expandable material composed of a copolymer of 85% of sytrene and 15% of acrylonitrile of the bulk density 0.025 gram/cubic centimetre is stored for 10 minutes in a solution of 10 parts of tri-(2.3-dibromopropanol-1)-phosphate in 90 parts of ethyl alcohol at room temperature. After removal, the material is allowed to lie in the air for 30 minutes. By this treatment the foamed material becomes difficultly inflammable. The flame extinguishes after ignition and removal of the igniting flame.

*Example 9*

1,000 parts of a coarse-grained copolymer of 80% of styrene and 20% of acrylonitrile are charged, after the addition of 80 parts of tri-(2.3-dibromopropanol-1)-phosphate, in a pressure vessel and butane is led in under 5 atmospheres' pressure. The vessel is then heated to 140° C. within 60 minutes and left at this temperature for 30 minutes. It is cooled and the compact material is comminuted in a cross-beater mill into particles of 1 to 4 millimetres' length and width.

The comminuted material is treated in a waterbath at 98° C. while stirring for 15 minutes. Difficultly inflammable individual particles of the bulk density 30 grams per litre are obtained. They are suitable as linings for packing containers for damping heat and impact.

*Example 10*

A tightly closable metal container is filled with the following mixture: 400 parts of styrene, 2.5 parts of divinylbenzene, 28 parts of hexane, 32 parts of tri-(2.3-dibromopropanol-1)-phosphate and 8 parts of benzoyl peroxide. The closed container is kept at 24° C. for 8 days and then at 35° C. for 20 days. A compact block is obtained which is cut into plates 6 millimetres in thickness. The plates are stored for 12 minutes in a steam autoclave at 110° C. (1 excess atmosphere of steam) and cooled. A difficultly inflammable foamed article is obtained of the bulk density 0.045 gram per cubic centimetre which can be used in the decoration industry.

*Example 11*

The following substances are charged into and mixed in a pressure autoclave:
950 parts of small-particled polystyrene, 50 parts of polyisobutylene and 70 parts of tri-(2.3-dibromopropanol-1)-phosphate. The autoclave is closed and carbon dioxide led in until a pressure of 25 excess atmospheres prevails. It is heated to 150° C. and kept at this temperature for 2 hours. Then it is cooled to 30° C. while maintaining the pressure, the mass removed and comminuted. 100 grams of the comminuted gas-containing material are charged into a perforated closable metal mold of 500 ccs. capacity, the mold closed and stored in water at 100° C. for 25 minutes. After cooling there is taken out of the mold a foamed-up article of the bulk-density 0.2 gram per cc. which is suitable as a net float. The foamed-up article will burn only in an extraneous flame.

*Example 12*

A stirrer-fitted pressure vessel is charged first with 20,000 parts of water and then with 6,000 parts of a small particled copolymer, i.e. having the size of rice grains, from 90% of styrene and 10% of N-vinylcarbazol. Then the vessel is closed, nitrogen is pressed in to set up a pressure of 3 atmospheres, the stirrer mechanism is set moving with 150 revolutions per minute and the feed stock heated to 60° C. This done a mixture of 480 parts of pentane and 360 parts of tri-(2.3-dibromopropanol-1)-phosphate is continuously pumped in at a rate of 60 parts per hour from a point situated as far as possible below the level of the liquid phase. When the mixture has been fed in after 14 hours, stirring is continued for another 60 hours. After cooling the vessel and releasing it of its pressure, the product is nutched off and dried at 40° C. Foamed articles made of the product so obtained only burn in the open flame, any burning being stopped when the flame is removed.

*Example 13*

The other factors being as in Example 12 the feed stock used consists of 20,000 parts of water
7.5 parts of alkyl sulfonate
7,500 parts of a bead copolymer from
  85% of styrene
  0.08% of divinylbenbene and
  15% of acrylonitrile Into this feed stock the mixture of 550 parts of methanol
450 parts of the tri-(2.3-dibromopropanol-1)-isocyanurate and
500 parts of technical-grade butane (boiling point at minus 10° to plus 5° C. at a pressure of 760 mm. Hg)

is pumped continuously at a rate of 60 parts per hour. It thus takes 25 hours until the mixture has been completely pumped in. The product is nutched off and subjected to a short-time drying at a temperature not exceeding 20° C.

The product can be used for the manufacture of porous articles which only burn in the open flame.

*Example 14*

A stirrer-fitted pressure vessel is charged with 12,000 parts of water
30 parts of a copolymer from
  94% of N-vinylpyrrolidone-2 and
  6% of methyl acrylate (with a molecular weight of 400,000 according to Staudinger, the copolymer being used as a protective colloid) and
6 parts of sodium pyrophosphate After closing the vessel, the mixture is stirred for a short time and then nitrogen is pressed in to set up a pressure of 2 atmospheres. Then a solution of 10,000 parts of styrene
600 parts of tri-(2.3-dibromopropanol-1)-phosphate
40 parts of lauroyl peroxide and
1,000 parts of difluordichlormethane is continuously pressed in and, when the impact of the solution is completed, the polymerization is carried out at 80° C. for 30 hours with continuous agitation. The vessel is then cooled down to room temperature and the polymer which is obtained in the form of small beads (with from 0.5 to 3 mm. in diameter) is centrifuged off.

It can be used for the manufacture of flame resisting foamed articles.

Similar results are obtained if propane is used instead of difluordichlormethane as a blowing agent.

Example 15

A mixture of
12,000 parts of water
30 parts of the protective colloid used in Example 14
and
6 parts of sodium pyrophosphate with 10,000 parts of styrene
100 parts of diallyl maleate
650 parts of tri-(2.3-dibromopropanol-1)-isocyanurate
45 parts of dibenzoyl peroxide and
700 parts of a mixture of about equal parts of butane and pentane (boiling point 0°–30° C. at a pressure of 760 mm. Hg)

is polymerized in a stirrer-fitted pressure vessel by the suspension method under the reaction conditions stated in Example 14. By processing the polymerization product in the usual manner, a cross-linked copolymer is obtained in the form of beads with from 0.5 to 3 mm. in diameter. It can be used for the manufacture of flame-resisting foamed articles.

The diallyl maleate component of the above-named mixture can be replaced with any other cross-linking component, as for example with small amounts of butandiol-1,4-divinyl ether, triallyl phosphate, divinyl benzene and allyl acrylate. The amount of the cross-linking component can be varied in accordance with the degree of cross-linking wanted.

Example 16

A pressure vessel is charged with 50 parts of a copolymer from 80% of styrene and 20% of 2,4-dimethylstyrene which contains 6% of tri-(2,3-dibromopropanol-1)-phosphate, closed and heated to 250° C. When the feed stock has attained this temperature, carbon dioxide is continuously pumped into the feed stock through a frit until the pressure in the gas space of the vessel is 40 atmospheres. The vessel is then allowed to cool with the pressure being maintained constant at 40 atmospheres by forcing in carbon dioxide or any other suitable gas, such as hydrogen or nitrogen, into the space above the polymerization charge. The solidified copolymer obtained is reduced to the form of grains having from 1 to 5 mm. in diameter. In the said fine-grained state the copolymer can be made into foamed articles by heating. As it can be shown by a flame test, the articles so obtained have distinct flame resisting properties.

The pore size of the foamed articles can be largely varied by the amount of the gases used as a blowing agent, i.e. by the pressures set up above the melt, and by the type of the inert gas used, i.e. whether carbon dioxide or hydrogen, nitrogen, ethane or another gas is used, and may range from very large, macroscopically detectable to very tiny cell sizes which can only be detected with the aid of a microscope.

We claim:

1. A difficultly inflammable expandable styrene polymer containing an ester selected from the group consisting of tri-(2.3-dibromopropanol-1)-ortho-phosphoric acid ester and tri-(2.3-dibromopropanol-1)-isocyanurate, the amount of bromine-containing ester being sufficient to provide a bromine content of between 0.2 and 6% by weight of the styrene polymer, and an expanding agent which is a volatile nonsolvent for the styrene polymer and has a boiling point below about 60° C.

2. A difficultly inflammable expendable styrene polymer containing tri-(2.3-dibromopropanol-1)-ortho-phosphoric acid ester, the amount of said ester being sufficient to provide a bromine content of between 0.2 and 6% by weight of the styrene polymer, and an expanding agent which is a volatile nonsolvent for the styrene and has a boiling point below about 60° C.

3. A difficultly inflammable expandable polystyrene containing tri-(2.3-dibromopropanol-1)-ortho-phosphoric acid ester, the amount of said ester being sufficient to provide a bromine content of between 0.2 and 6% by weight of said polystyrene, and an expanding agent which is a volatile nonsolvent for the polystyrene and has a boiling point below about 60° C.

4. A difficultly inflammable expandable styrene acrylonitrile copolymer of at least 50% styrene containing tri-(2.3-dibromopropanol-1)-ortho-phosphoric acid ester, the amount of said ester being sufficient to provide a bromine content of between 0.2 and 6% by weight of said styrene acrylonitrile copolymer, and an expanding agent which is a volatile nonsolvent for the styrene acrylonitrile copolymer and has a boiling point below about 60° C.

5. A difficultly inflammable expandable thermoplastic styrene divinyl benzene copolymer of at most about 1% of divinyl benzene containing tri-(2.3-dibromopropanol-1)-ortho-phosphoric acid ester, the amount of said ester being sufficient to provide a bromine content of between 0.2 and 6% by weight of said styrene divinyl benzene copolymer, and an expanding agent which is a volatile non-solvent for the styrene divinyl benzene copolymer and has a boiling point below about 60° C.

6. A difficultly inflammable porous cellular polymer containing an ester selected from the group consisting of tri-(2.3-dibromopropanol-1)-ortho-phosphoric acid ester and tri-(2.3-dibromopropanol-1)-isocyanurate, the amount of bromine-containing ester being sufficient to provide a bromine content of between 0.2 and 6% by weight of the styrene polymer.

7. A difficultly inflammable porous cellular styrene polymer containing tri-(2.3-dibromopropanol-1)-ortho-phosphoric acid ester, the amount of said ester being sufficient to provide a bromine content of between 0.2 and 6% by weight of the styrene polymer.

8. A process for the production of a difficultly inflammable porous cellular styrene polymer containing a major proportion of styrene which comprises: adding to the polymerizable reactants prior to polymerization an ester selected from the group consisting of tri-(2.3-dibromopropanol-1)-ortho-phosphoric acid ester and tri-(2.3-dibromopropanol-1)-isocyanurate, the amount of the bromine-containing ester being sufficient to provide a bromine content to the final polymer compostion of between 0.2 and 6% by weight with reference to the styrene polymer, and an expanding agent which is a volatile organic hydrocarbon having a boiling point below about 60° C. and which is a nonsolvent for the styrene polymer; polymerizing the resulting mixture in an aqueous suspension at a temperature below the softening range of the styrene polymer to obtain expandable bead-shaped particles of said polymer; and expanding said polymeric bead-shaped particles by heating in a mass to a temperature above the softening range of the styrene polymer.

9. A process as claimed in claim 8 wherein the added ester is tri - (2.3 - dibromopropanol-1)-ortho-phosphoric acid ester.

10. A process for the production of a difficultly inflammable styrene polymer which comprises adding to monomeric styrene an ester selected from the group consisting of tri-(2.3-dibromopropanol-1)-ortho-phosphoric acid ester and tri-(2.3-dibromopropanol-1)-isocyanurate, and polymerizing the resulting mixture in an aqueous suspension, the amount of bromine-containing ester being sufficient to provide a bromine content of between 0.2 and 6% by weight with respect to the resulting styrene polymer.

11. A process as claimed in claim 10 wherein the ester is tri-(2.3-dibromopropanol-1)-ortho-phosphoric acid ester.

12. A process as claimed in claim 10 wherein there is added to the polymerizable mixture of monomeric styrene and said ester an expanding agent which is capable of expanding the styrene polymer formed by said polymerization, which is a volatile organic hydrocarbon having a boiling point in a temperature range below about 60° C. and which is a nonsolvent for the styrene polymer.

13. A process as claimed in claim 12 wherein the resulting styrene polymer is expanded by heating to a temperature above its softening point.

14. A process for the production of a difficultly inflammable expandable styrene polymer whch comprises incorporating into said polymer (A) an ester selected from the group consisting of tri-(2.3-dibromopropanol-1)-ortho-phosphoric acid ester and tri-(2.3-dibromopropanol-1)-isocyanurate, the amount of bromine-containing ester being sufficient to provide a bromine content of between 0.2 and 6% by weight with respect to the styrene polymer, and (B) an expanding agent which is a volatile nonsolvent for said styrene polymer and which has a boiling point below about 60° C.

15. A process as claimed in claim 14 wherein the ester is tri-(2.3 - dibromopropanol-1)-ortho-phosphoric acid ester.

References Cited in the file of this patent
UNITED STATES PATENTS

| | | |
|---|---|---|
| 1,936,985 | Lommel et al. | Nov. 28, 1933 |
| 2,676,927 | McCurdy et al. | Apr. 27, 1954 |
| 2,744,291 | Stastney et al. | May 8, 1956 |
| 2,773,046 | Dunn et al. | Dec. 4, 1956 |

---

UNITED STATES PATENT OFFICE

CERTIFICATE OF CORRECTION

Patent No. 3,001,954                September 26, 1961

Karl Buchholz et al.

It is hereby certified that error appears in the above numbered patent requiring correction and that the said Letters Patent should read as corrected below.

Column 6, line 35, for "divinylbenbene" read -- divinylbenzene --; column 7, line 72, for "expendable" read -- expandable --; column 8, line 49, for "compostion" read -- composition --; column 10, line 14, for "Stastney" read -- Stastny --.

Signed and sealed this 3rd day of April 1962.

(SEAL)
Attest:

ERNEST W. SWIDER                DAVID L. LADD
Attesting Officer                Commissioner of Patents

UNITED STATES PATENT OFFICE
CERTIFICATE OF CORRECTION

Patent No. 3,001,954                          September 26, 1961

Karl Buchholz et al.

It is hereby certified that error appears in the above numbered patent requiring correction and that the said Letters Patent should read as corrected below.

Column 6, line 35, for "divinylbenbene" read -- divinylbenzene --; column 7, line 72, for "expendable" read -- expandable --; column 8, line 49, for "compostion" read -- composition --; column 10, line 14, for "Stastney" read -- Stastny --.

Signed and sealed this 3rd day of April 1962.

(SEAL)
Attest:

ERNEST W. SWIDER
Attesting Officer

DAVID L. LADD
Commissioner of Patents